(12) United States Patent
Johnson et al.

(10) Patent No.: US 7,643,440 B1
(45) Date of Patent: Jan. 5, 2010

(54) INTEGRATED TELEVISION AND BROADBAND DATA SYSTEM FOR AIRCRAFT

(75) Inventors: Mark W. Johnson, Cedar Rapids, IA (US); Geoffrey J. Barnes, Cedar Rapids, IA (US); Christopher M. Merry, Long Beach, CA (US); Christopher T. Evans, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 571 days.

(21) Appl. No.: 10/793,701

(22) Filed: Mar. 4, 2004

(51) Int. Cl.
*H04B 7/185* (2006.01)

(52) U.S. Cl. .................. 370/316; 455/12.1; 455/13.3

(58) Field of Classification Search ................ 370/338, 370/465, 316; 455/12.1, 13.3; 725/72, 73, 725/74, 75, 76
See application file for complete search history.

(56) References Cited

U.S. PATENT DOCUMENTS

| | | | |
|---|---|---|---|
| 4,352,200 A | | 9/1982 | Oxman |
| 5,912,641 A | * | 6/1999 | Dietrich ................ 342/354 |
| 5,973,647 A | | 10/1999 | Barrett et al. |
| 5,990,928 A | | 11/1999 | Sklar et al. |
| 6,201,797 B1 | | 3/2001 | Leuca et al. |
| 6,529,706 B1 | * | 3/2003 | Mitchell ................ 455/12.1 |
| 6,626,275 B2 | | 9/2003 | Lee |
| 6,677,900 B1 | | 1/2004 | Thouvenel et al. |
| 6,720,920 B2 | | 4/2004 | Breed et al. |
| 6,950,073 B2 | * | 9/2005 | Clymer et al. ........... 343/713 |
| 2002/0087992 A1 | * | 7/2002 | Bengeult et al. ........ 725/76 |
| 2002/0150061 A1 | * | 10/2002 | Arsenault ................ 370/326 |

OTHER PUBLICATIONS

Airshow Previews New Multi-Region Airborne TV System, Partners with Jet Aviation for Certification on Wide Body Business Jet, May 28, 2002, 2 pages, Airshow, Inc., Tustin, CA.
Airshow Signs Strategic Alliance With AeroSat for Next Generation TV Antennas, Dec. 4, 2001, 2 pages, Airshow, Inc., Tustin, CA.

* cited by examiner

*Primary Examiner*—Joseph H Feild
*Assistant Examiner*—Huy D Nguyen
(74) *Attorney, Agent, or Firm*—Matthew J. Evans; Daniel M. Barbieri

(57) ABSTRACT

An integrated airborne broadband data and television system is disclosed. The integrated system includes an aircraft mounted pointable antenna unit. Further, the integrated system includes pointing command electronics providing pointing commands to the antenna unit. The pointing commands are based on requested access to one of data services and television services. Further, the disclosed integrated system includes a processing unit directing signal information to one of a data transmitter receiver and a television signal receiver decoder unit.

21 Claims, 2 Drawing Sheets

INTEGRATED TELEVISION AND BROADBAND DATA SYSTEM FOR AIRCRAFT

BACKGROUND

Antennas and associated electronics systems for reception of satellite broadcasted signals designed for mounting on various vehicles such as but not limited to aircraft are known. Such systems may receive broadcast signals in the form of live television and radio and provide such data streams to passengers in the aircraft or other vehicle in the form of television broadcasts or radio broadcasts. Television broadcasts may be in the form of digital broadcast satellite (DBS) television service.

It has also been known to provide broadband data connectivity in the form of reception and transmission of radio signals to and from satellite systems from a vehicle such as an aircraft. Such broadband connectivity may provide connectivity to internet services such as the Worldwide Web, corporate internet services, virtual private networks (VPNs), etc. Further, broadband connectivity may provide passengers real time high speed data performance to all on-board users and may provide other data to both passengers and crew members of the aircraft or other vehicles.

Such systems require a significant amount of hardware as well as dedicated antennas on the vehicle or aircraft. In the case of an aircraft, it is desirable to minimize antennas and other equipment due to weight and space constraints.

Accordingly, there is a need for an integrated system which provides both broadband connectivity and DBS television service reception through an integrated system which does not require duplication of certain hardware portions.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An example of the invention relates to an integrated airborne broadband data and television system. The system comprises an aircraft mounted pointable antenna unit and pointing command electronics providing pointing commands to the antenna unit. The pointing commands are based on requested access to one of data services and television services. Further, the system comprises a processing unit directing signal information to one of a data transmitter receiver server and a television signal receiver decoder unit.

Another example of the invention relates to an integrated airborne data services and broadcast television services system. The system comprises at least one aircraft mounted pointable antenna unit and pointing command electronics providing pointing commands to the at least one antenna unit. The pointing commands are dependent on received satellite parameters and dependent on aircraft positioning parameters. The system also comprises a processing unit directing received signal information to at least one of a broadband data subsystem and a broadcast television subsystem.

Yet another example of the invention relates to a method of receiving both broadband data and television broadcast signals on board an aircraft. The method comprises receiving pointing parameters for directing an aircraft mounted antenna toward a broadband data services satellite. The method also comprises receiving, via the antenna, broadband data services signals. Further, the method comprises receiving a request for broadcast television services and generating pointing parameters for pointing the antenna toward a broadcast television satellite. Further still, the method comprises pointing the antenna according to the pointing parameters, and receiving, via the antenna, broadcast television signals.

Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
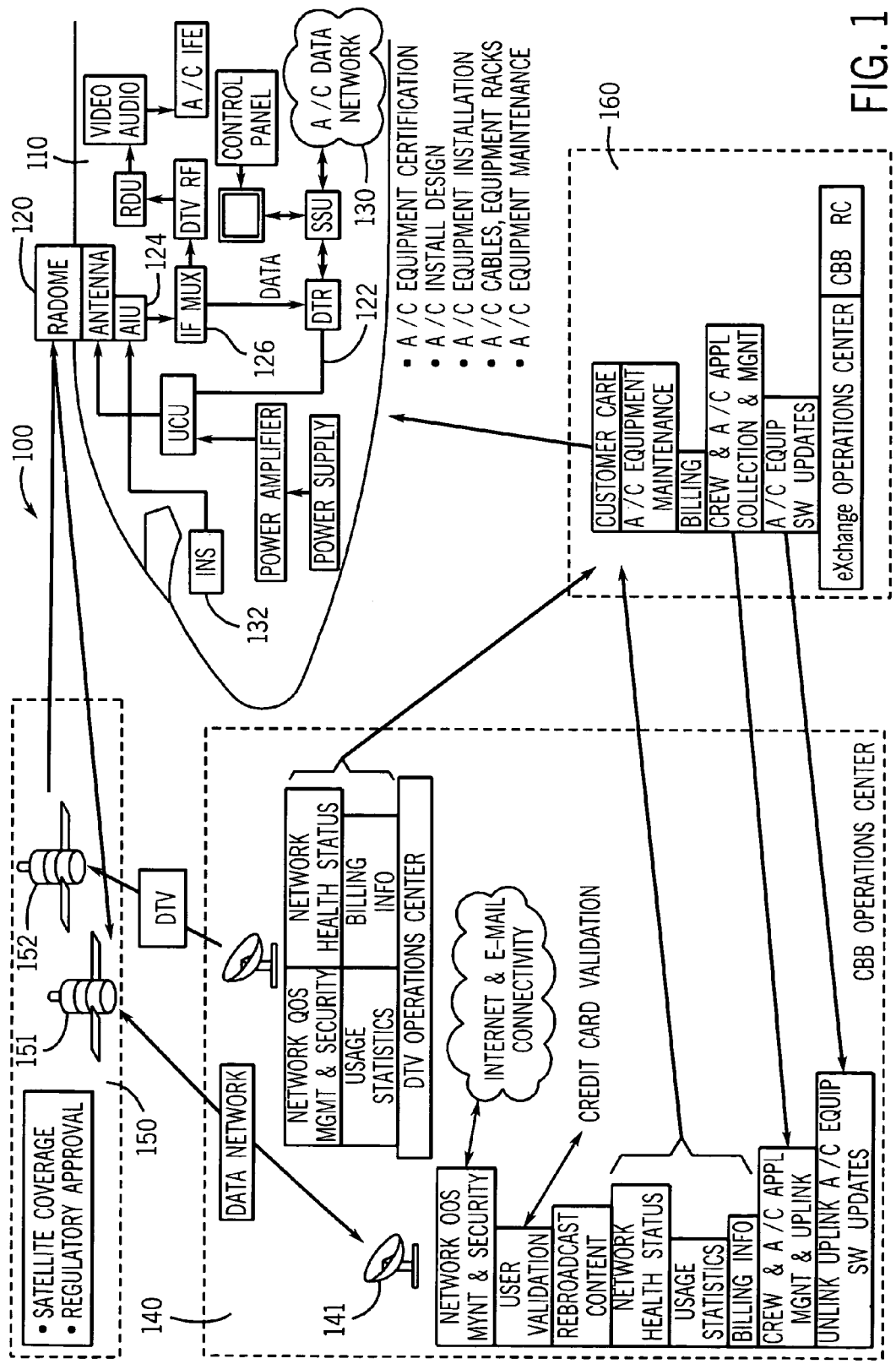
FIG. 1 is an exemplary diagram of a exemplary integrated television and broadband data system for an aircraft.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIG. 1, an integrated multi-region television reception and two-way, broadband data network system for an aircraft 110 is depicted. System 100 may provide aircraft passengers on board aircraft 110 with multi-region television reception and two-way broadband internet protocol (IP) connectivity to the ground, as well as other broadband data services. The IP connectivity in general may provide access to corporate intranets (i.e., e-mail, shared servers, etc.) via commercially available techniques used today by mobile travelers (i.e., virtual private networks (VPN(s)), and the worldwide web (internet) in an exemplary embodiment, IP connectivity to the ground may be achieved through the use of a bidirectional KU band antenna 120 and a transmit receive system including data transceiver router (DTR) 122. In an exemplary embodiment antenna system 120 which includes antenna interface unit (AIU) 124 and intermediate frequency (IF) multiplexer (MUX) 126 may be capable of supporting either television or data services, but not both simultaneously. In an alternative embodiment, the antenna system may be constructed to support both television and data services simultaneously. In the case that the antenna system is capable of supporting either television or data services but not simultaneously, an on-board control function may be used to determine the operating mode (television or data services) of the system. Alternatively, a specialized antenna and front end electronics can be provided which permits simultaneous reception of both television and data services.

In an exemplary embodiment, the system on-board aircraft 110 may interface to a aircraft data network 130 which may provide data connectivity throughout the cabin.

System 100 is generally comprised of four major segments including but not limited to a ground segment 140, a space segment 150, an airborne segment, represented by aircraft 110, and a logistical support segment 160.

Data services may be provided from ground segment 140 via a data network antenna 141. The data network antenna 141 communicates with a data network satellite 151 having a transponder thereon which communicates with antenna 120. Satellite 150 may utilize KU-band transponders, or other suitable transponders. Data services provided to aircraft 110 may include, but are not limited to, services in which users may access the internet, internet e-mail, corporate e-mail, etc. similar to that which is available to a mobile user in a hotel room. Services may include internet access, intranet access, rebroadcast audio, rebroadcast video, etc. Internet access may utilize two-way data transfer access to the public internet using data types consistent with internet transport protocols. A user on-board aircraft 110 connecting to data network 130 may initiate and complete a supported VPN from their personal electronic device (such as, but not limited to a notebook computer) through data network 130 to satellite 151 and ground antenna 141. System 100 may support various data protocols, such as, but not limited to, point-to-point tunneling protocol (PPTP), internet protocol security (IPSEC), etc.

System 100 may also be designed with the capability to receive rebroadcast audio channels and receive rebroadcast radio channels. Further, other data services may be provided such as but not limited to video teleconferencing services, and dedicated crew/operator applications. Further still, system 100 may support various enhanced voice services and alternative crew and operator applications. Such services may include private voice services and/or may support cellular technology via GSM handsets or TDMA and 3G handsets.

Coverage via satellite may be provided worldwide, or alternatively may be provided where satellite infrastructure is already established and may be expanded as satellite coverage is expanded in the future. In an exemplary embodiment, the broadband data service may support a forward-link (i.e., ground to aircraft) which is typically greater than 5 Mbps. A return link (i.e., aircraft to ground) may be implemented using a bandwidth on-demand system, in which aircraft communicating with a single satellite are allocated dedicated bandwidth on an as-needed basis, with the amount of bandwidth ranging between a minimum of 16 Kbps up to a maximum of 520 Kbps. Requests for increasing or decreasing return-length bandwidth are carried out automatically by the system and will depend upon the time-varying user demand on board the aircraft. However, the data speeds provided above should not be viewed as a limiting factor in the broadband data service but are only provided as an example of a single exemplary implementation. Broad-band data services may be provided with much greater speeds.

In an exemplary embodiment, uplink transmissions from aircraft to satellite may be provided in a frequency band between 14.0 GHz and 14.4 GHz. Further, in an exemplary embodiment, downlink transmissions from satellite to aircraft may be provided in a frequency band between 11.2 GHz and 12.8 GHz. These frequency bands are provided as exemplary and the invention should not be seen as limited to such frequency bands.

Television coverage may be provided in many areas covering the earth, which is restricted by satellite network coverage. However, it should be noted that television coverage may be utilized in various areas or it may be utilized worldwide. For example, coverage in the contiguous United States may be provided through DirecTV™ programming. Other areas of the world may utilize various different television networks. Logistics operation 160 may include an infrastructure which provides all the necessary functionality required to be an internet service providers (ISP) for aircraft-based end users. This may include, but is not limited to, satellite ground stations, internet point of presence (POP), wide area network (WAN), compliance with local-regional-state licensing and operating requirements, etc. In an exemplary embodiment, the logistics system 160 may have functionality to allow for positive control of the airborne antenna 120 from a ground-based control center. Further, the logistics system 160 may handle customer care, aircraft equipment maintenance, billing, crew and aircraft application collection and management, aircraft equipment software updates, etc.

Space segment 150 may include a system of data satellites having transponders on board a system of data satellite 151 which may be combined with a system of television satellites 152. In an exemplary embodiment, each of these satellites, in particular satellites 151, may include multiple transponders thereon.

Airborne system 110 includes two subsystems, a television subsystem and a data services subsystem. These subsystems are combined in an integrated system which may utilize a single antenna 120 to accommodate both television and data services. Operation may be limited at lower altitudes, although it may be possible to augment the data services using other data system providers or sources. The antenna interface unit 124 may be coupled to the avionics system including an inertial navigation system (INS) 132 or other aircraft sensors and aircraft sensor data. Such a connection may be provided through an ARINC-429 bus or other data connection. A CMS or cabin management system may provide information to the antenna interface to transition from data services to television and vice versa. A user interface may be provided which allows users with various privileges to access the systems providing certain setting, setup, or configurations which may be used by the user or may be applied throughout the system. Further, a true interface may be provided which may be used to provide certain specified types of information to crew members.

Other services which may be provided through the integrated system include but are not limited to videoconferencing, voice-over-IP (VOIP), and rebroadcast TV and audio. In an alternative embodiment, the system may be provided with multiple antennas for simultaneous TV reception and data services.

Figure 2:
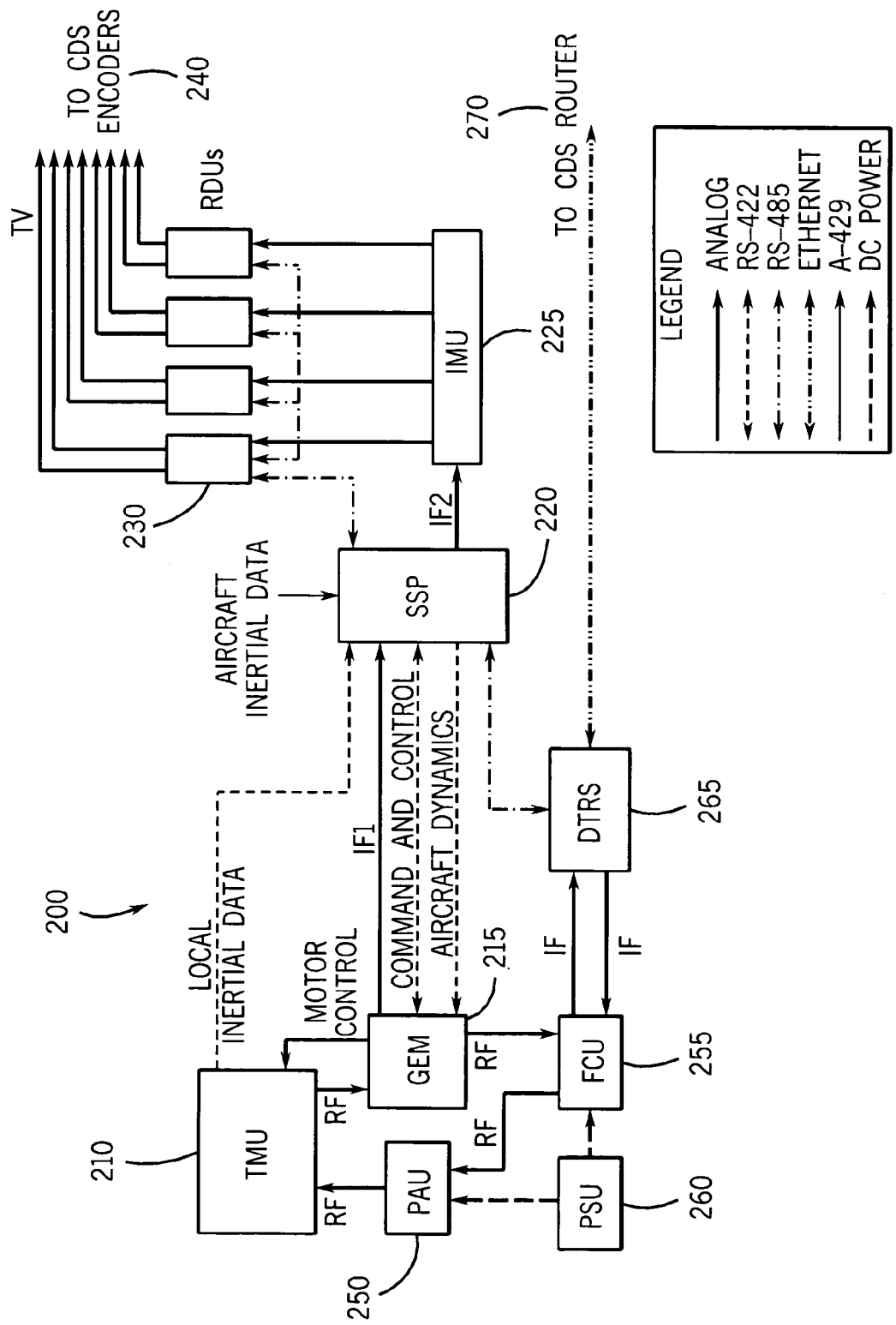
FIG. 2 is an exemplary block diagram of an alternative integrated television and broadband data system.

Referring now to FIG. 2, another exemplary on-board system 200 is depicted. System 200 includes a tail mounted antenna unit (TMU) 210. TMU 210 is coupled to a gimbal electronics module (GEM) 215. GEM 215 and TMU 210 communicate with a systems signal processor (SSP) 220. SSP 220 communicates with an intermediate multiplexer unit (IMU) 225. IMU 225 is coupled to a plurality of receiver decoder units (RDU) 230. RDU 230 provides TV signals to CDS encoders 240.

For the data services portion of system 200, TMU 210 is coupled to a power amp unit (PAU) 250. PAU 250 is coupled to a frequency converter unit (FCU) 255 and power supply unit (PSU) 260. PSU 260 is coupled to a DTRS 265 which provides information to and from a CDS router 270.

TMU 210 may be a Tailwind 500 antenna system (TW-500), available from Rockwell Collins, Inc., of Cedar Rapids, Iowa, that is mechanically steered, horn type, bidirectional antenna. The TMU may be a tail mounted antenna.

In an exemplary embodiment, it may preferable to provide an antenna that is capable of receiving both TV and data simultaneously. If transponders are available on a single satellite broadcasting both TV and data services or satellites are co-located, simultaneous TV and data services using a single antenna may be provided. It may also be possible to rebroadcast TV services over the data network which may allow for a limited number of channels while data services are active. Such rebroadcast TV may be encoded using MPEG for compression, or other compression schemes.

In an exemplary embodiment, in order to accommodate data services, TMU 210 is a transmit and receive antenna The TW-500 may be modified to accommodate both transmit and receive or a transmit/receive antenna may be designed from the ground up. GEM 215 provides pointing and tracking over the TMU 210. GEM 215 may also provide intermediate down conversion of the received KU band signal to the 950-2150 megahertz frequency range. Other down converters may be equally applicable. SSP 220 may provide the primary interface between the aircraft and the remainder of the TV subsystem. SSP 220 receives aircraft dynamics data (i.e., altitude, heading, position, etc.) from the aircraft's inertial sensor via the ARINC-429 bus. SSP 220 also receives satellite position parameters from the RDUs 230. Aircraft dynamic parameters and satellite position parameters are passed from SSP 220 to GEM 215 on a communications bus which may be used as a command and control bus. The SSP is used to select between passing TV satellite parameters to GEM 215 or passing data service parameters to GEM 215.

The unaugmented sensor packaged may be provided near the location of TMU 210 which will compensate a pointing accuracy to include local structural deflections with respect to the aircraft inertial center. DTRS 265 may provide SSP 220 with satellite position parameters and link status information to be used to determine when the antenna can be transitioned to a TV satellite for an orderly transition. The SSP will provide the DTRS with raw aircraft dynamic parameters, processed aircraft dynamic parameters (upward of complementary filter) and antenna pointing parameters from GEM 215. RDUs 230 may receive an L-band output from IMU 225. Each RDU may implement two totally independent receiver/decoder channels. The front end of each channel may be a tuner capable of tuning to a carrier in the frequency range of the RF interface. The resulting tune signal may then be demodulated and the appropriate forward error correction (FEC) may be applied. Each channel may also contain necessary smart card electronic to provide decryption for conditional access systems (CAS). Each RDU may then output two analog TV signals. The format of these signals is independent of the region in which the signal is being received.

Now returning to the data services section of the on-board package 200, power amplifier unit 250 may be responsible for increasing the power output of FCU 255. Input to PAU 250 may be a KU band RF signal. PAU 250 receives its input power from power supply unit 260. FCU 255 may be responsible for two frequency conversions including down converting KU band RF output from TMU 210 to L-band for distribution to DTRS 265, also upconverting L-band output from DTRS 265 to KU band for PAU 250.

In an exemplary embodiment PSU 260 may receive 28 volt DC aircraft power and generate and distribute various voltage signals required by FCU 255 and PAU 250. DTRS 265 provides the interface between CBB broadband data service and cabin distribution services. The DTRS 265 may provide the following high-level functions, including, but not limited to, RF receiver, tuner, demodulator, decoder, forward error correction, routing, network management, application platform, application storage, links management, encoder, modulator, RF transmitter. Various cabin distribution systems may be used including but not limited to VRS ethernet based systems and other systems.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. An integrated airborne broadband data and television system, comprising:
    an aircraft mounted pointable antenna unit;
    a user interface to provide information to transition from data services to television services and from the television services to the data services;
    pointing command electronics providing pointing commands to steer the antenna unit, the pointing commands being based on requested access to one of the data services and the television services, wherein the pointing command electronics comprise a gimbal electronics module, wherein the pointing command electronics determine when the antenna unit can be steered from pointing to a broadband data services satellite to pointing to a broadcast television satellite in response to the information from the user interface to transition from the data services to the television services; and
    a processing unit directing signal information to one of a data transmitter receiver server and a television signal receiver decoder unit.

2. The system of claim 1, wherein the processing unit provides television broadcast signals to an intermediate multiplexer unit coupled to a plurality of receiver decoder units, each receiver decoder unit coupled to a respective television encoder unit.

3. The system of claim 1, wherein the data transmitter receiver unit is coupled to a frequency converting unit.

4. The system of claim 3 wherein the frequency converting unit delivers transmit signals to a power amplifier unit.

5. The system of claim 4, wherein the power amplifier unit delivers an amplified transmit signal to the antenna.

6. The system of claim 1, wherein the broadband data services include internet data services.

7. The system of claim 1, wherein the gimbal electronics module receives data services signals from the broadband data services satellite in a data services mode and television signals from the television satellite in a television mode.

8. An integrated airborne data services and broadcast television services system comprising:
    at least one aircraft tail mounted pointable antenna unit;
    pointing command electronics providing pointing commands to steer the at least one antenna unit, the pointing commands dependent on received satellite parameters and dependent on aircraft positioning parameters, wherein the pointing command electronics determine when the antenna unit can be steered from pointing to a broadband data services satellite to pointing to a broadcast television satellite in response to a user request to transition from data services to television services; and a processing unit directing received signal information to at least one of a broadband data subsystem and a broadcast television subsystem.

9. The system of claim 8, wherein the pointing command electronics comprise a gimbal electronics module.

10. The system of claim 8, wherein the processing unit provides television broadcast signals to an intermediate multiplexer unit coupled to a plurality of receiver decoder units, each receiver decoder unit coupled to a respective television encoder unit.

11. The system of claim 8, wherein the broadband data subsystem is coupled to a frequency converting unit.

12. The system of claim 11 wherein the frequency converting unit delivers transmit signals to a power amplifier unit.

13. The system of claim 12, wherein the power amplifier unit delivers an amplified transmit signal to the antenna.

14. The system of claim 8, wherein the broadband data services include internet data services.

15. A method of receiving both broadband data and television broadcast signals on board an aircraft, comprising:

receiving first pointing parameters for directing an aircraft mounted antenna toward a broadband data services satellite;

pointing the antenna according to the first pointing parameters;

receiving, via the antenna, broadband data services signals;

receiving a request for broadcast television services from a user interface within the cabin of the aircraft;

generating second pointing parameters for pointing the antenna toward a broadcast television satellite;

pointing the antenna by steering according to the second pointing parameters; and receiving, via the antenna, broadcast television signals.

16. The method of claim 15, further comprising providing pointing command electronics for generating the first and second pointing parameters, the pointing command electronics comprising a gimbal electronics module.

17. The method of claim 15, further comprising providing the television broadcast signals to an intermediate multiplexer unit.

18. The method of claim 15, further comprising providing the broadband data services signals to a frequency converting unit.

19. The method of claim 18 wherein the frequency converting unit delivers transmit signals to a power amplifier unit.

20. The method of claim 19, wherein the power amplifier unit delivers an amplified transmit signal to the antenna.

21. The method of claim 15, wherein the broadband data services include internet data services.

* * * * *